United States Patent Office 3,117,951
Patented Jan. 14, 1964

3,117,951
PROCESS FOR PRODUCING POLYVINYL ALCOHOL-VINYLAMINE COPOLYMERS
Kazuo Itoi, Kurashiki City, Japan, assignor to Kurashiki Rayon Co., Ltd., Okayama Prefecture, Japan, a corporation of Japan
No Drawing. Filed May 27, 1960, Ser. No. 32,084
Claims priority, application Japan May 29, 1959
7 Claims. (Cl. 260—91.3)

This invention relates to a method of making nitrogen-containing polyvinyl alcohol copolymers and is more particularly concerned with the production of nitrogen-containing polyvinyl alcohol copolymers derived from copolymers of vinyl chloride and a vinyl ester. It is an object of the present invention to provide a novel process for producing nitrogen-containing polyvinyl alcohol copolymers.

It is known that the chlorine atoms in polyvinyl chloride are relatively stable against ammonia, and that the substitution with amino groups is rather difficult to effect.

According to the invention, the desired polyvinyl alcohol copolymers containing basic nitrogen are produced by treating copolymers of vinyl chloride and vinyl esters with ammonia to effect simultaneous saponification and introduction of nitrogen, the reaction being carried out in bulk or in solution.

I have discovered that the copolymers of vinyl esters and vinyl chloride exhibit solubility and swelling characteristics in liquid ammonia, a high-concentration aqueous solution of ammonia, or an organic solvent solution of ammonia, and when treated by these ammoniacal media, the ester radical is saponified and converted into the hydroxyl group, and simultaneously a major or a minor proportion, depending upon the circumstances, of the chlorine atoms of the vinyl chloride unit react to introduce the amino group, whereby a polyvinyl alcohol copolymer having amino groups or poly-(vinylamine-vinyl-alcohol) as its principal composition, can easily be obtained.

Vinyl ester-vinyl chloride copolymers suitable for use in the process of this invention include vinyl chloride copolymers of vinyl formate, vinyl acetate, vinyl propionate, vinyl butylate, vinyl monochloracetate, and like alkyl and halo-alkyl vinyl esters. The copolymer of vinyl chloride with vinyl acetate is generally preferred and found most suitable because it is low-priced, readily obtained and easily manufactured, but other vinyl chloride-vinyl ester copolymers, e.g. copolymers with lower alkyl- or lower haloalkyl esters are fully operative in the process of this invention.

The reaction temperature may vary but a temperature within the range of 0° C. to 150° C. is most suitably used. Particularly preferred are temperatures ranging from room temperature, e.g. 20° C., to about 100° C.

The copolymer subjected to reaction may be swollen or dissolved in a solvent, such as an alkyl alcohol or an ether, or the like but this is generally not necessary since the copolymer will tend to swell and dissolve even in liquid ammonia alone. Advantageously an ammonia salt such as ammonium nitrate or ammonium acetate is also present in the saponification mixture in the amount of 20–25% by weight of the polymer.

At the time of reaction, the vinyl chloride units are involved in two reactions, viz. amino-substitution and dechlorination. The ratio between these two reactions is governed by the composition of the copolymer and the conditions of reaction. The smaller the content of vinyl chloride units in the copolymer, or the lower the reaction temperature, the greater will be the ratio of amino-substitution compared with dechlorination.

As mentioned, the ammonia used for the reaction may be liquid ammonia, a high-concentration, e.g. saturated, water solution of ammonia, or an organic solvent solution, such as methanol, ethanol, and like alkyl alcohols, of high concentration ammonia, or water alcohol solution of ammonia may be used. The vinyl chloride-vinyl ester copolymers can be used directly, i.e. in bulk, or they can be employed in solution in a solvent such as dimethylformamide, dimethylsulfoxide, tetrahydrofuran, and the like.

The copolymers may be of varying composition but when the mol percentage of vinyl chloride in the copolymer exceeds 80%, the solubility of the copolymer will be low, making it difficult to cause reaction, and the product will be colored. With a vinyl chloride content of less than 80 mol percent however, a product polyvinyl alcohol copolymer of white color will be obtained. The solubility in solvents of the product copolymer will, of course, vary according to the composition of raw material vinyl chloride-vinyl ester copolymers. Generally speaking, however, they are soluble in water and methanol, and can be formed by techniques conventionally used with polyvinyl alcohol, into films, fibers, and like forms of excellent dyeability.

The invention will be further understood from the following specific examples of practical application. However, it will be understood that these examples are not to be construed as limiting the scope of the present invention in any manner. In these examples, all parts are by weight, unless otherwise indicated.

EXAMPLE 1

Five grams of each of the copolymers of vinyl chloride and vinyle acetate having the compositions set forth in Table 1, liquid ammonia (20 g.), and ammonium nitrate (1 g.) were placed in autoclaves of 100 cc. capacity, and reaction was carried out at 100° C. for 8 hours. When the reaction was completed, at the end of this time, each autoclave valve was opened and excess liquid ammonia was allowed to evaporate. Each saponification reaction product was removed from its autoclave and then dissolved in water, and low-molecular substances were removed by dialysis or low-molecular substances were removed directly by methanol extraction according to solubility of the saponified copolymer in methanol. The water dissolved products were precipitated by means of acetone, whereby a white resin was obtained in each case. By analysis, the nitrogen and chlorine content and the chemical composition of each of these saponification products was determined, the values being set forth in Table 1, as follows:

Table 1

| Test No. | Vinyl chloride content in the copolymer placed in the autoclave (mol percent) | Analysis of saponification product | | Amount of reaction of the vinyl chloride composition (mol percent) | Amount of dechlorination (mol percent) | Amount of amino-substitution (mol percent) |
|---|---|---|---|---|---|---|
| | | N, percent | Cl, percent | | | |
| 1 | 4.3 | 0.646 | 0. | 100 | 53.5 | 46.5 |
| 2 | 15.7 | 1.72 | 1.88 | 95.5 | 62.4 | 33.1 |
| 3 | 44.9 | 3.93 | 3.80 | 92.7 | 67.9 | 24.7 |
| 4 | 66.5 | 5.99 | 6.67 | 87.4 | 62.7 | 24.7 |
| 5 | 83.8 | 3.50 | 17.0 | 66.4 | 54.2 | 12.2 |

EXAMPLE 2

A vinyl acetate copolymer containing 8.7 mol percent vinyl chloride (20 g.), ammonium acetate (5 g.), and liquid ammonia (63 g.) were placed in an autoclave of 200 cc. capacity, and the mixture was allowed to stand at room temperature for 10 days. After opening the valve in order to allow the unreacted liquid ammonia to evaporate, and the polymer remaining was removed and methanol extraction was carried out for 16 hours by means of a Soxhlet extractor in order to extract low-molecular substances. By analyzing the extract for chlorine content, the amount of the vinyl chloride component which reacted was ascertained and by determining the nitrogen content of the residual polymer after extraction, the amount of amino-substitution was ascertained. It was thus found that 11 mol percent of the vinyl chloride in the composition placed in the autoclave reacted, and 56.7 mol percent of this reacted vinyl chloride was involved in amino-substitution.

EXAMPLE 3

Vinyl acetate (700 g.), vinyl chloride (50 g.) and alpha,alpha'-azobisisobutyronitrile (3 g.) were placed in an autoclave of 1-liter capacity, and polymerization was effected at 60° C., whereby a copolymer with a percent polymerization of 68% was obtained. Fifty gram samples of this copolymer (50 g.) and liquid ammonia (150 cc.) were each placed in autoclaves of 300 cc. capacity, and the autoclaves were maintained at 100° C., for various periods of time, viz. 1 day, 2 days, and 3 days. Using the same procedure described in Example 2, the reaction products were recovered and extracted to remove low-molecular substances, and the polymers remaining after extraction were subjected to analysis for nitrogen and chlorine, with the following results:

| Reaction Time (Number of Days) | Analysis of saponification product | |
|---|---|---|
| | N, percent | Cl, percent |
| 1 | 1.12 | 5.59 |
| 2 | 1.32 | 3.20 |
| 3 | 1.36 | 1 |

It can thus be seen that by the proper selection of reaction time all of the vinyl chloride component of the polymer can be made to react.

EXAMPLE 4

Five grams of a vinyl acetate copolymer containing 15.7 mol percent vinyl chloride, a water-methanol mixture (1:1 by weight) containing 40% ammonia (50 g.) and ammonium nitrate (1 g.) were subjected to reaction in an autoclave of 100 cc. capacity at 60° C. for 2 days. After the reaction, the autoclave was opened to remove the polymer solution and, by acetone precipitation, a white resin was obtained. Using the procedure described in Example 2, this product was subjected to extraction by using a methanol-acetone mixture as the extraction solvent, in order to remove low-molecular substances. When nitrogen and chlorine contents were determined, it was found that 31.4 mol percent of the vinyl chloride component had reacted and that 27.8 mol percent of the vinyl chloride reaction was accompanied by amino-substitution.

EXAMPLE 5

A vinyl acetate copolymer containing 15.7 mol percent vinyl chloride (5 g.), 60% ammonia water (35 g.) and ammonium nitrate (1 g.) were reacted in an autoclave of 100 cc. capacity at 60° C. for two days. After the reaction, the product was processed in the manner described in Example 4, and it was found that 31.8 mol percent of the vinyl chloride component reacted and that 27.2 mol percent of the reacted vinyl chloride was attributed to amino-substitution.

EXAMPLE 6

A vinyl acetate copolymer containing 15.7 mol percent vinyl chloride (5 g.), 20% ammonia-methanol solution (100 g.), and ammonium nitrate (1 g.) were reacted in an autoclave of 200 cc. capacity at 60° C. for 2 days. After the completion of reaction, the product was treated in the manner specified in Example 4. It was found that 38 mol percent of the vinyl chloride had reacted, and that amino-substitution accounted for 32 mol percent of the reacted vinyl chloride.

In all of the foregoing examples, the residual ester in the saponified products were less than 1%, and the vinyl acetate was almost completely saponified.

The vinyl chloride-vinyl ester copolymers which may be employed in the process of this invention to produce the polyvinyl alcohol copolymers containing basic nitrogen, are known compounds suitably made by conventional copolymerization techniques as exemplified, for example, in Example 3. It will be understood therefore that, unless otherwise indicated, conventional operations and conventional apparatus such as autoclaves or like pressure vessels, are employed in carrying out the process of this invention. The conditions and the relative relationships set forth in the examples are those preferred in carrying out the process of the invention but it will be understood that other conditions and relationships may be used within the scope of the invention.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

I claim:

1. A process of producing a nitrogen-containing polyvinyl alcohol copolymer which comprises the step of saponifying a copolymer of vinyl chloride and a vinyl ester by treating said last-named copolymer at a temperature of 0° to 150° with ammonia in the amount of about three to about four times the weight of said last-named copolymer, whereby to effect simultaneous saponification and amino-substitution of said last-named copolymer.

2. A process of producing a nitrogen-containing polyvinyl alcohol copolymer which comprises the step of saponifying a copolymer of vinyl chloride and vinyl acetate by treating said last-named copolymer at a temperature of 0° to 150° C. with ammonia in the amount of about three to about four times the weight of said last-named copolymer, whereby to effect simultaneous saponification and amino-substitution of said last-named copolymer.

3. A process of producing a nitrogen-containing polyvinyl alcohol copolymer which comprises the step of saponifying a copolymer of vinyl chloride and a vinyl ester by treating the last-named copolymer at a temperature of 0° to 150° C. wth ammonia in an amount of at least about five times the theoretical quantity required for reaction with all of the ester groups, said amount being sufficient to cause reaction of at least some of the chlorine groups in said copolymer of vinyl chloride and a vinyl ester, whereby to effect simultaneous saponification and amino-substitution of said last-named copolymer.

4. A process of producing a nitrogen-containing polyvinyl alcohol copolymer which comprises the step of saponifying a copolymer of vinyl chloride and vinyl acetate by treating the last-named copolymer at a temperature of 0° to 150° C. with ammonia in an amount of at least about five times the theoretical quantity required for reaction with all of the ester groups, said amount being sufficient to cause reaction of at least some of the chlorine groups in said copolymer of vinyl chloride and vinyl acetate, whereby to effect simultaneous saponification and amino-substitution of said last-named copolymer.

5. A process for producing interpolymers of vinyl alcohol and vinylamine containing at least about 0.5 mol percent vinylamine which comprises contacting a copolymer of vinyl chloride and a vinyl ester of an aliphatic monocarboxylic acid with ammonia in the liquid phase at a temperature of 0° to 150° C., the amount of ammonia being at least about three times the weight of said copolymer, thereby aminating at least a portion of the vinyl chloride groups in said copolymer and producing the aforesaid interpolymer of vinyl alcohol and vinylamine.

6. A process for producing interpolymers of vinyl alcohol and vinylamine containing at least about 0.5 mol percent vinylamine which comprises contacting a copolymer of vinyl chloride and vinyl acetate with ammonia in the liquid phase at a temperature of 0° to 150° C., the amount of ammonia being at least about three times the weight of said copolymer, thereby aminating at least a portion of the vinyl chloride groups in said copolymer and producing the aforesaid interpolymer of vinyl alcohol and vinylamine.

7. A process for producing interpolymers of vinyl alcohol and vinylamine containing at least about 0.5 mol percent vinylamine which comprises contacting a copolymer of vinyl chloride and a vinyl ester of an aliphatic monocarboxylic acid with ammonia in the liquid phase at a temperature of 0° to 150° C. and for a period of at least about eight hours, the amount of ammonia being at least about three times the weight of said copolymer, said liquid phase also containing about 20 to 25 percent, based on the weight of copolymer, of a salt selected from the group consisting of ammonium nitrate and ammonium acetate, thereby aminating at least a portion of the vinyl chloride groups in said copolymer and producing the aforesaid interpolymer of vinyl alcohol and vinylamine.

References Cited in the file of this patent

UNITED STATES PATENTS

| | | |
|---|---|---|
| 2,467,774 | Plambeck | Apr. 19, 1949 |
| 2,792,376 | Binkley | May 14, 1957 |

UNITED STATES PATENT OFFICE
CERTIFICATE OF CORRECTION

Patent No. 3,117,951 January 14, 1964

Kazuo Itoi

It is hereby certified that error appears in the above numbered patent requiring correction and that the said Letters Patent should read as corrected below.

Column 2, line 33, for "vinyle" read -- vinyl --; column 3, in the table, last column thereof, for "1" read -- 0 --; line 49, for "of", second occurrence, read -- at --.

Signed and sealed this 23rd day of June 1964.

(SEAL)
Attest:

ERNEST W. SWIDER
Attesting Officer

EDWARD J. BRENNER
Commissioner of Patents